Oct. 18, 1949.  P. G. HANSEL  2,484,824

RADIO DIRECTION FINDING METHOD AND APPARATUS

Filed Sept. 12, 1945  2 Sheets-Sheet 1

*INVENTOR.*
PAUL G. HANSEL
BY
*William D. Hall*
*Attorney*

Oct. 18, 1949.  P. G. HANSEL  2,484,824
RADIO DIRECTION FINDING METHOD AND APPARATUS
Filed Sept. 12, 1945  2 Sheets-Sheet 2

INVENTOR.
PAUL G. HANSEL
BY

Patented Oct. 18, 1949

2,484,824

UNITED STATES PATENT OFFICE 2,484,824

RADIO DIRECTION FINDING METHOD AND APPARATUS

Paul G. Hansel, Red Bank, N. J.

Application September 12, 1945, Serial No. 615,905

16 Claims. (Cl. 343—113)

(Granted under the act of March 3, 1883, as amended April 30, 1928; 370 O. G. 757)

The invention described herein may be manufactured and used by or for the Government for governmental purposes, without the payment to me of any royalty thereon.

My present invention relates to radio direction finding methods and apparatus, and particularly to radio direction finders of the spaced-aerial type.

One of the objects of this invention is to provide a method for altering the effective electrical spacing between two or more aerials without altering the actual physical spacing.

A further object of this invention is to provide a method for reducing bearing errors due to space-diversity effects.

A still further object of this invention is to provide practical spaced-aerial direction finders having less than the usual physical spacing between the individual aerials, thus making them more suitable for shipboard or aircraft use.

It is well known to workers in the field of short-wave radio direction finding that many signals received on spaced-aerial antenna systems exhibit almost continual changes in the apparent direction of arrival. Frequently, the bearing indication of a direction finder having a cathode-ray tube indicator will spin rapidly around the entire 360-degree range of the azimuth scale, thus rendering accurate reading of the bearing almost impossible. It has been customary to attribute such fluctuations of the apparent direction of arrival almost entirely to polarization changes and scattering. It has also been quite widely believed that no instrumental measures can be taken at the direction finder to permit the taking of accurate bearings under such conditions.

However, recent experimental studies indicate that the amount of bearing fluctuation which exists is often closely related to the physical spacing between the individual aerials of the antenna system. In one test two direction finders were operated side-by-side. Both direction finders employed four-element, fixed Adcock antenna systems, one with a 35-foot diagonal spacing and the other with a 16-foot spacing. In many instances a signal received on the widely-spaced antenna system exhibited violent fluctuations in apparent direction while the same signal received on the closely-spaced antenna exhibited either a steady bearing or a bearing with only minor fluctuations. These and further investigations have shown that in the operation of a well-designed spaced-aerial direction finder, space-diversity effects often constitute a more serious cause of bearing instability than either polarization changes or scattering.

As is well known, most of the spaced-aerial direction finders of prior art require equal field strengths at all of the aerials. Therefore, when the spacing is an appreciable part of a wavelength, for example one-quarter wavelength, space diversity effects which produce significant and constantly varying field-strength inequalities among the individual aerials will cause the bearing indication to fluctuate.

The foregoing discussion suggests that the obvious solution to the problem of direction finding when space-diversity effects exist is to employ a conventional spaced-aerial antenna system with a very small physical spacing. However, although it is true that the use of a very small physical spacing results in substantial fulfillment of the equal field strength requirement, it is found in practice that a direction finding antenna system with a very small spacing is extremely critical to construct and adjust. The reason for this is that slight electrical unbalances among the aerials and their interconnecting circuits will override the intended differential effects due to the small phase differences between the signals induced in the individual aerials.

In accordance with this invention I overcome this difficulty by employing a spaced-aerial antenna system with a small physical spacing and then I expand the effective electrical spacing by frequency multiplication to emphasize the small direction-dependent phase differences. The use of a small physical spacing results in greatly improved operation when diversity effects are present, and expansion of the effective electrical spacing makes the phase difference between the signals induced in the individual aerials large enough to overcome the effects of unavoidable circuit unbalances.

For a better understanding of the invention, together with other and further objects thereof, reference is had to the following description taken in connection with the accompanying drawings, wherein like parts are indicated by like reference numerals and wherein.

Figure 1:
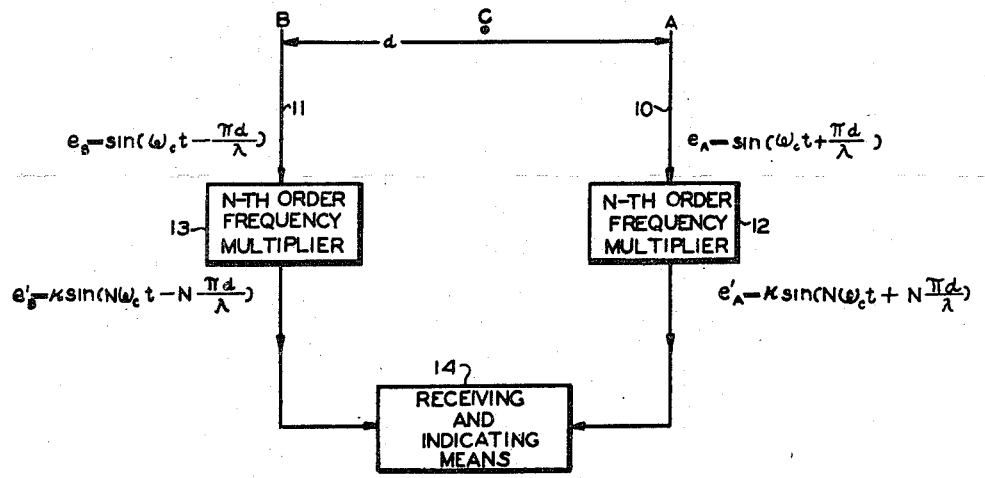
Figure 1 is a schematic circuit diagram of my invention which illustrates the basic method by which the electrical spacing between two spaced aerials is increased.

Referring now to Fig. 1, there are shown a pair of spaced aerials 10 and 11, at points A and B, respectively. Assume that a wave arrives from the right along a line of direction passing through both antennas. If the field at the midpoint c is expressed by an equation of the form:

$$E_c = \sin \omega_c t \qquad (1)$$

then the signal voltages $e_A$ and $e_B$ induced in the antennas at points A and B, respectively, may be expressed by equations of the form:

$$e_A = \sin\left(\omega_c t + \frac{\pi d}{\lambda}\right) \qquad (2)$$

$$e_B = \sin\left(\omega_c t - \frac{\pi d}{\lambda}\right) \qquad (3)$$

The electrical spacing $\phi$ between the antennas at A and B is:

$$\phi = \frac{2\pi d}{\lambda} \qquad (4)$$

Figure 2:
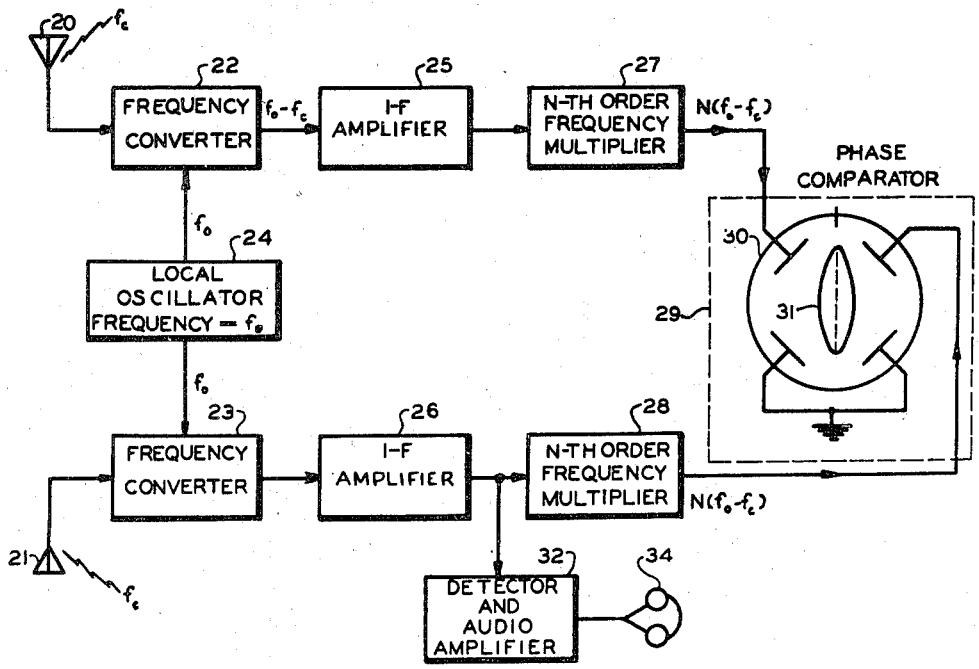
Figure 2 is a schematic circuit diagram which shows a practical direction finder with a twin-channel receiver embodying the invention.

To multiply this electrical spacing by any arbitrary factor N the operation of frequency multiplication is performed by frequency multipliers 12 and 13 before the signals are combined in the receiving and indicating means 14, as illustrated in Fig. 2. After multiplication the signal due to antenna 10 at point A becomes:

$$e'_A = k \sin\left(N\omega_c t + N\frac{\pi d}{\lambda}\right) \qquad (5)$$

and the signal due to antenna 11 at point B becomes:

$$e'_B = k \sin\left(N\omega_c t - N\frac{\pi d}{\lambda}\right) \qquad (6)$$

Therefore, within the receiving and indicating means 14 the apparent or effective electrical spacing is:

$$\phi_e = N\frac{2\pi d}{\lambda} \qquad (7)$$

or, in other words, the effective spacing is multiplied by the order of the frequency multipliers 12 and 13.

The basic method which has been described thus far, while valid in principle, is difficult to carry out with the frequency multipliers interposed directly between the antennas and the receiving and indicating means. Figure 2 illustrates a direction finder which employs the method of this invention in a more realizable manner. In Fig. 2, two spaced antennas 20 and 21 are shown. It is assumed that these antennas are movable and can be oriented with respect to the wavefront of the received signal. Antennas 20 and 21 each derive a signal of the carrier frequency $f_c$ and these signals are applied to frequency converters 22 and 23, respectively. A local oscillator 24 supplies a common signal of frequency $f_o$ to the two frequency converters. A signal having the frequency $(f_o - f_c)$ is obtained from each converter. These signals are amplified independently in intermediate-frequency amplifiers 25 and 26 and are then applied to frequency multipliers 27 and 28 to obtain two signals having the frequency $N(f_o - f_c)$ and, of course, correspondingly expanded phase differences. The two frequency-multiplied or phase-expanded signals are applied to an indicator 29 which is a cathode-ray tube 30, utilized as a phase comparator. In operation, the relative phase and gain character-istics of the I.-F. amplifiers 25 and 26 are so adjusted that the indicating display 31 is a straight line making an angle of 45-degrees with the axes of deflection when equiphase signals are induced in antennas 20 and 21. The display will then be a line when antennas 20 and 21 both lie in the wavefront and will open up into an ellipse when the antennas are not in the wavefront.

For monitoring purposes an audio channel is provided which consists of a detector and audio amplifier 32 and headphones 34. This channel is connected ahead of the multiplier 28 to avoid distortion.

Figure 3:
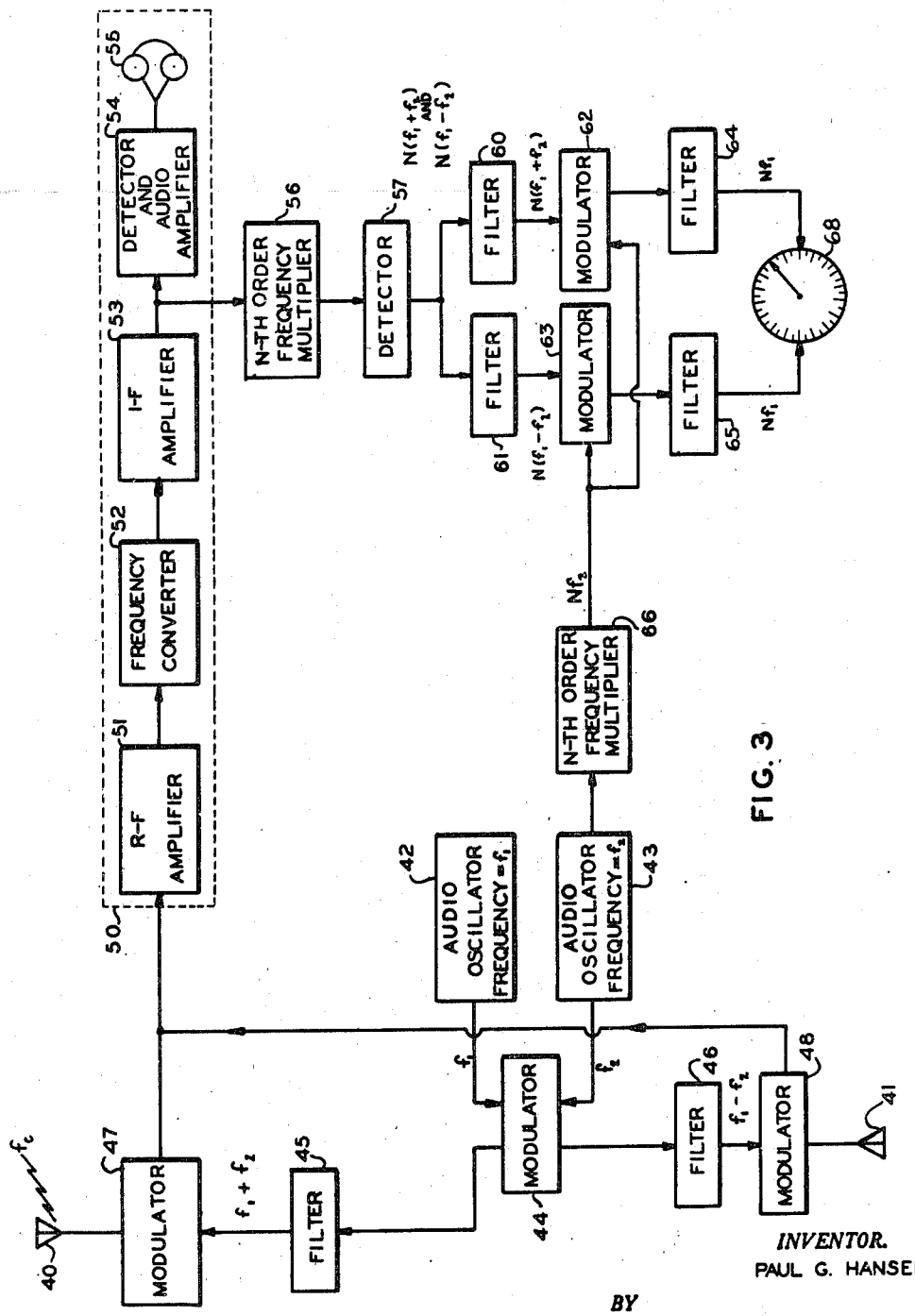
Figure 3 is a schematic circuit diagram of a single-channel direction finder embodying the invention.

In some practical cases it will be inconvenient to employ a multi-channel receiver as shown in Fig. 2. Figure 3 shows one way in which this invention can be employed with a single-channel receiver. An oscillator 42 supplies a signal of frequency $f_1$, and a second oscillator 43 supplies a signal of a second frequency $f_2$. The outputs of these oscillators are applied to a modulator 44. At the output of said modulator a filter 45 selects the frequency $(f_1 + f_2)$, and a second filter 46 selects the frequency $(f_1 - f_2)$. Suitable values for $f_1$ and $f_2$ are 400 and 100 cycles per second respectively. The frequency $(f_1 + f_2)$ is used in a modulator 47 to modulate the signal derived by antenna 40. Similarly, the frequency $(f_1 - f_2)$, is used in modulator 48 to modulate the signal derived by a second antenna 41. Modulators 47 and 48 are preferably of the single side-band or asymmetric side-band type. The carrier and sideband outputs of modulators 47 and 48 are applied to the input of receiver 50, in this case of the superheterodyne type comprising an R.-F. amplifier 51, a frequency converter 52, an I.-F. amplifier 53, a detector and audio amplifier 54, and a sound reproducer 55. Part of the output signal from the intermediate frequency amplifier 53 of said receiver is impressed upon a frequency multiplier 56, wherein the frequency is multiplied by a factor N. The output of said multiplier is rectified by a detector 57 to produce two signals having the frequencies $N(f_1 + f_2)$ and $N(f_1 - f_2)$, respectively. A filter 60 selects the frequency $N(f_1 + f_2)$ which is impressed upon modulator 62. Another filter 61 selects the frequency $N(f_1 - f_2)$ which is impressed upon modulator 63.

A signal of the frequency $f_2$ is derived from oscillator 43 and multiplied N times in multiplier 66 to produce a signal of the frequency $Nf_2$ which is in turn impressed upon modulators 62 and 63.

Filters 64 and 65 select signals of the frequency $Nf_1$ from the outputs of modulators 62 and 63, respectively. The signal from filter 64 is related in phase to the carrier signal induced in antenna 40 and, in a like fashion, the signal from filter 65 is related to the carrier signal induced in antenna 41. The two signals of the frequency $Nf_1$, are then applied to an indicator 64 which may consist of a cathode-ray tube utilized in the manner shown in Fig. 2. The relative phase and amplitude characteristics of filters 64 and 65 should be made adjustable to facilitate balancing or calibration before operation.

Of the many modified embodiments of this invention which are possible, a few will be referred to briefly. A direct reading direction finder could be constructed along the lines shown in Fig. 2 by employing four aerials with separate receiving channels and frequency multipliers associated with each aerial. In this manner four signals having expanded phase differences could be obtained. These four signals could then be applied directly to the respective deflection plates of a cathode-ray tube to present directional information, or mechanical or electronic goniometric techniques could be used.

In the direction finder shown in Fig. 2 it may, under certain circumstances, be preferable to employ a common beat-frequency oscillator for I.-F. amplifiers 25 and 26, then to rectify the output of each I.-F. amplifier and apply the rectified signals to individual synchronized multivibrators or relaxation-oscillator frequency multipliers.

If a presentation method is used which requires substantial equality among the phase-expanded signals, amplitude limiting or automatic gain control can be applied advantageously to each signal.

The methods illustrated in Fig. 3 can be utilized readily in the design of direct reading direction finders employing four or more spaced aerials. In such designs a third oscillator providing a frequency $f_3$ could be associated with oscillators 42 and 43 and modulator 44 in Fig. 3. From modulator 44 low-frequency, phase-interlocked signals of the frequencies $(f_1+f_2)$, $(f_1-f_2)$, $(f_1+f_2+f_3)$, $(f_1+f_2-f_3)$, $(f_1-f_2+f_3)$ and $(f_1-f_2-f_3)$ would then be available to modulate the signals derived by the spaced aerials.

Although this invention has been described in relation to direction finding techniques it will of course be apparent that the methods disclosed here will have application to other fields involving measurement, comparison, or utilization of small phase differences.

While there have been described what are at present considered preferred embodiments of the invention, it will be obvious to those skilled in the art that various changes and modifications may be made therein without departing from the invention, and it is aimed in the appended claims to cover all such changes and modifications as fall within the true spirit and scope of the invention.

What is claimed is:

1. The method of determining the direction of arrival of wave energy which comprises the step of deriving signals from said wave energy at more than one point in space, multiplying the phase difference between at least one pair of said derived signals, and indicating said direction as a function of the multiplied phase difference.

2. The method of changing the electrical spacing between physically-displaced antennas of a direction-sensitive receiver, which comprises the step of frequency multiplying the output of each of said antennas an equal number of times.

3. The method of changing the electrical spacing between physically-displaced antennas of a direction-sensitive receiver, comprising the steps of frequency converting the output of each of said antennas and then frequency multiplying selected frequency conversion products.

4. A direction finder comprising means for deriving a signal at each of a plurality of physically-displaced points, means for expanding the phase differences among the signals so derived, and direction indicating means responsive to the resulting signals.

5. The method of determining the direction of arrival of wave energy which comprises the steps of deriving a signal from said wave energy at each of at least two physically-displaced points, electrically expanding the phase differences between the signals so derived, and translating the expanded phase differences into directional information.

6. The method of determining the direction of arrival of wave energy which comprises the steps of deriving a signal from said wave energy at each of a plurality of physically-displaced points, multiplying the frequency of each signal so derived an equal integral number of times, and translating the phase differences among the frequency-multiplied signals into directional intelligence.

7. The method of determining the direction of arrival of a received wave, which comprises receiving said wave at a plurality of spaced points, locally generating a pair of alternating potentials having different frequencies heterodyning said potentials to produce sum and difference frequency potentials, modulating the wave received at one point with said sum frequency potential, modulating the wave received at another point with said difference frequency potential, combining both of the modulated waves to derive a resultant wave, frequency multiplying said resultant wave an integral number of times, detecting the frequency multiplied wave to derive a pair of signals having frequencies equal to said sum and difference frequencies multiplied by said integral number, separating said signals, frequency multiplying one of the locally generated potentials the same number of times to derive a resultant potential, separately heterodyning said signals with said resultant potential to derive two resultant signals having the same frequency, and determining the phase relationship between said resultant signals to determine said direction of arrival.

8. A direction finding system comprising at least a pair of physically spaced aerials, means for locally generating a pair of alternating potentials having different frequencies $f_1$ and $f_2$, means for heterodyning said potentials to produce a sum frequency potential and a difference frequency potential, means for separately modulating the respective waves received by said aerials by said sum and difference frequency potentials, respectively, means for combining all of the modulated waves to derive a resultant wave, means for frequency multiplying said resultant wave by a factor N, means for detecting said frequency multiplied waves to derive signals having frequencies $N(f_1+f_2)$ and $N(f_1-f_2)$ cycles, means for separating said signals, means for frequency multiplying one of the locally generated potentials by the factor N to derive a resultant potential, means for separately heterodyning said signals with said resultant potential to derive two resultant signals having the same frequency, and means for measuring the phase relation of said resultant signals to determine the direction of arrival of the received wave.

9. In combination in a direction finding system, a plurality of physically-displaced collector elements, means for multiplying the effective electrical displacement between said collector elements, and direction-indicating means responsive to said effective electrical displacement.

10. A direction finder comprising a plurality of physically-displaced wave collectors; a plurality of equal-order frequency multipliers, one associated with each of said collectors; and direction indicating means receptive of the outputs of said frequency multipliers, and responsive to the phase relation of the outputs of said frequency multipliers.

11. A direction finder comprising a plurality of physically-displaced wave collectors; a plurality of receiving channels, each receptive of the output of at least one of said wave collectors; a plurality of equal-order frequency multipliers, one associated with each of said receiving channels; and direction-indicating means receptive of the outputs of said channels, and responsive to the phase relation of the outputs of said frequency multipliers.

12. A direction finder comprising means for deriving a plurality of waves from a plurality of points; means for modulating each of said waves at a different frequency and for combining the resulting modulation products in a common receiving channel; frequency-multiplying means in said channel for expanding the phase differences among said modulation products; and means for translating said phase differences into directional intelligence.

13. The method of increasing the directional sensitivity of a spaced-aerial direction finder in which the spacing of the aerials is reduced to minimize space-diversity effects, which comprises compensating for said reduced spacing by multiplying by an equal amount the frequency of the waves received by each antenna.

14. The method of increasing the directional sensitivity of a spaced-aerial direction finder in which the spacing of the aerials is reduced to minimize space-diversity effects, which comprises compensating for said reduced spacing by separately multiplying by an equal amount the frequency of the waves received by each antenna.

15. A direction finder comprising means for deriving from a radiated wave a plurality of waves at a plurality of physically-spaced points, a plurality of heterodyne frequency converters for separately converting the frequency of said derived waves to like lower frequency waves, a like plurality of frequency multipliers for separately multiplying the frequencies of said lower frequency waves by equal amounts, and means for comparing the phase relation of the outputs of said frequency multipliers to determine the direction of arrival of said radiated wave.

16. A direction finder as set forth in claim 15, wherein all of said frequency converters are coupled to a common local oscillator.

PAUL G. HANSEL.

REFERENCES CITED

The following references are of record in the file of this patent:

UNITED STATES PATENTS

| Number | Name | Date |
| --- | --- | --- |
| 1,510,792 | Merritt | Oct. 7, 1924 |
| 1,952,879 | Martin | Mar. 27, 1934 |
| 2,035,759 | Pool | Mar. 31, 1936 |
| 2,133,303 | Mirick | Oct. 18, 1938 |
| 2,144,203 | Shanklin | Jan. 17, 1939 |
| 2,198,113 | Holmes | Apr. 23, 1940 |
| 2,234,654 | Runge | Mar. 11, 1941 |
| 2,282,402 | Hefele | May 12, 1942 |
| 2,387,569 | Eggers | Oct. 23, 1945 |
| 2,403,500 | Carlson | July 9, 1946 |
| 2,423,103 | Koechlin | July 1, 1947 |
| 2,423,437 | Budenbom | July 8, 1947 |
| 2,437,695 | Jansky | Mar. 16, 1948 |